United States Patent [19]

Wetzel

[11] 4,406,749
[45] Sep. 27, 1983

[54] SOLAR WATER DISTILLATION APPARATUS

[76] Inventor: David B. Wetzel, 1722 Thurston Dr., Laguna Beach, Calif. 92651

[21] Appl. No.: 351,644

[22] Filed: Feb. 23, 1982

[51] Int. Cl.³ ............................................. B01D 3/00
[52] U.S. Cl. ............................... 202/234; 203/DIG. 1
[58] Field of Search .......... 202/234, 163, 182, 185 R, 202/185 B, 233; 203/DIG. 1, 10

[56] References Cited

U.S. PATENT DOCUMENTS 4,159,228  6/1979  Bellanpe et al. ................ 202/234
4,344,824  8/1982  Soleau ................................ 203/49

FOREIGN PATENT DOCUMENTS 673587  3/1939  Fed. Rep. of Germany ...... 202/234

Primary Examiner—Frank Sever
Attorney, Agent, or Firm—Jack C. Munro

[57] ABSTRACT

A water distillation apparatus which produces distilled water by means of solar energy. The water to be distilled is confined within an internal chamber and subjected to solar energy through a transparent lid. The water that is distilled collects on the interior surface of the lid. The lid is located at an inclined position with respect to gravity. The droplets of distilled water which adhere to the interior surface of the lid flow to the lowest elevation of the lid. These accumulated droplets of distilled water are to be removed and collected within a collecting container. A water inlet valve assembly is connected to supply water within the internal chamber.

8 Claims, 6 Drawing Figures

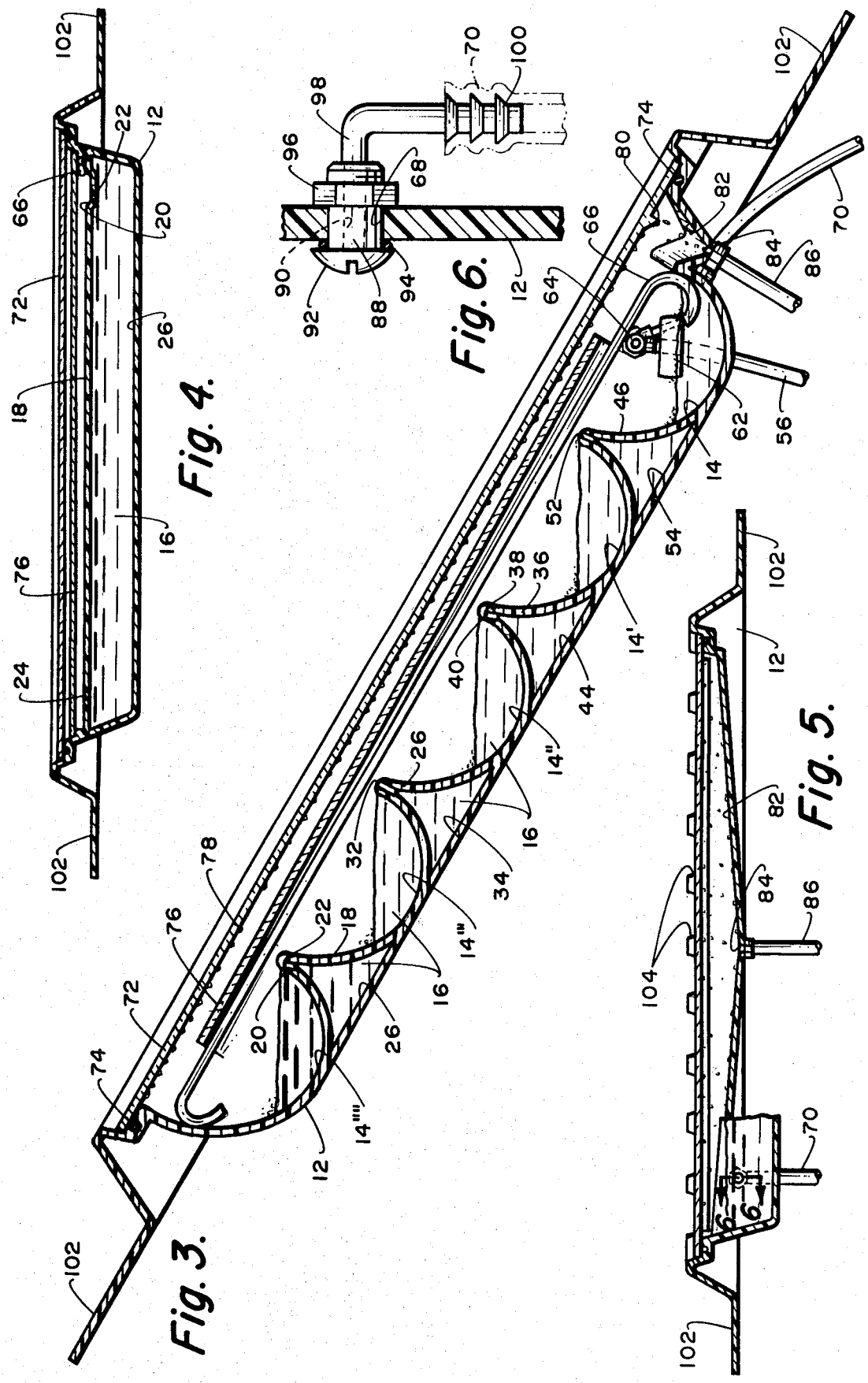

SOLAR WATER DISTILLATION APPARATUS

BACKGROUND OF THE INVENTION

The field of this invention relates to water distillation apparatuses and more particularly to a water distillation apparatus which could be readily mounted at any desired location that is exposed to the sun.

Pollution is defined as the contamination of one substance by another so that the former is unfit for its intended use. Water is essential to animal life. Chemically, water is a good solvent for many substances. This means that water is readily susceptible to pollution.

In many parts of the United States and the world, drinking water contains excessive pollutants. Also, drinking water standards in some cities permitt the water to contain over a thousand parts per million of pollutants because it is not economically feasible to have those pollutants removed from the drinking water. Human beings consume this water, Many of these pollutants remain within the body of the human being. Excessive collecting of these pollutants can become toxic to the human being.

Within the past few years, there has evolved businesses which sell distilled water which is to be used for consumption purposes. However, this distilled drinking water is available only to heavily populated areas. In a great many rural areas, brackish water is a serious problem. If the water is only midly brackish, these rural people consume it and eventually become used to it. If the water is too brackish, they are required to ship in drinking water from other areas.

There have been previous attempts to design individual water distillation apparatuses. The prior art type of water distillation apparatuses generally utilize input energy in the form of electricity. Known types of water distillation apparatuses are what is commonly referred to as reverse osmosis or a filtering arrangement. One disadvantage of these known types of water distillation apparatuses is that they be located near a source of electrical energy. Also, they require periodic maintenance in the form of cleaning and replacement of filters. Further, these known types are quite complex in construction and therefore expensive. Because of their expense, as well as their other disadvantages, such water distillation apparatuses have not been able to be employed in widespread use.

It would be desirable to design a water distillation apparatus which could be manufacturered relatively inexpensively and which required no artificial energy input permitting the water distillation apparatus to be utilized within any normal environment.

SUMMARY OF THE INVENTION

The water distillation apparatus of this invention takes the form of a housing which includes a series of troughs which are to contain water that is to be distilled. The troughs are to be inclined and connected together through a conduit assembly so that water can flow by gravity from one trough to another. The internal chamber in the area of the trough is closed by means of a transparent lid. Solar energy is to be conducted through the transparent lid and when subjected to the water contained within the troughs, causes some of the water to be distilled. As the distilled droplets collect on the inner surface of the lid and with the lid located in the inclined position, these water droplets will move to the lowest elevation. At the lowest elevation, the water droplets are removed and deposited within a water distillation outlet assembly which discharges the distilled water into a collecting container. A water inlet assembly, which operates through a float valve is connected to the housing. When the water level has reached a predetermined low level, the valve is actuated, permitting water that is to be distilled to be resupplied into the troughs. The valve assembly is to function automatically, that is, to supply water when it is needed. Upon reaching a certain level, further supply of water is terminated. After a distillating cycle, the apparatus is to automatically purge itself of the remaining undistilled (brackish) water.

The primary objective of this invention is to construct a water purifying apparatus which requires the addition of only solar energy as the input energy.

Another objective of the water distillation apparatus of this invention is to construct a device which operates automatically, requiring very little attention automatically repeating distilling cycles.

Another objective of this invention is to construct a water distillation apparatus which can be manufacturered relatively inexpensively and therefore can be readily available to individuals of modest financial means.

BRIEF DESCRIPTION OF THE DRAWINGS

FIG. 3 is a cross-sectional view taken along line 3—3 of FIG. 2;

FIG. 4 is a cross-sectional view taken along line 4—4 of FIG. 2;

FIG. 5 is a cross-sectional view taken along line 5—5 of FIG. 2;

FIG. 6 is a cross-sectional view taken along line 6—6 of FIG. 5 showing one type of fitting utilized in conjunction with the water distillation apparatus of this invention.

DETAILED DESCRIPTION OF THE SHOWN EMBODIMENT

The primary purpose of the water distillation apparatus 10 of this invention is to provide quantities of high grade distilled water to be utilized as a primary source of potable drinking water. The apparatus 10 of this invention is not only to be used as an alternative to bottled water services, but is also to be utilized in areas in which there is no bottled water services. The apparatus 10 of this invention is designed for automatic filling, purging of residue and automatic discharge of the distilled water. The apparatus of this invention can be mounted at any convenient location, such as on the roof of a house or building, or on a free standing base which is to be located on any convenient supportive surface. The apparatus can be inset within the roof of a house so as to extend within the attic area of the house to take advantage of solar heat trapped therein.

Figure 1:
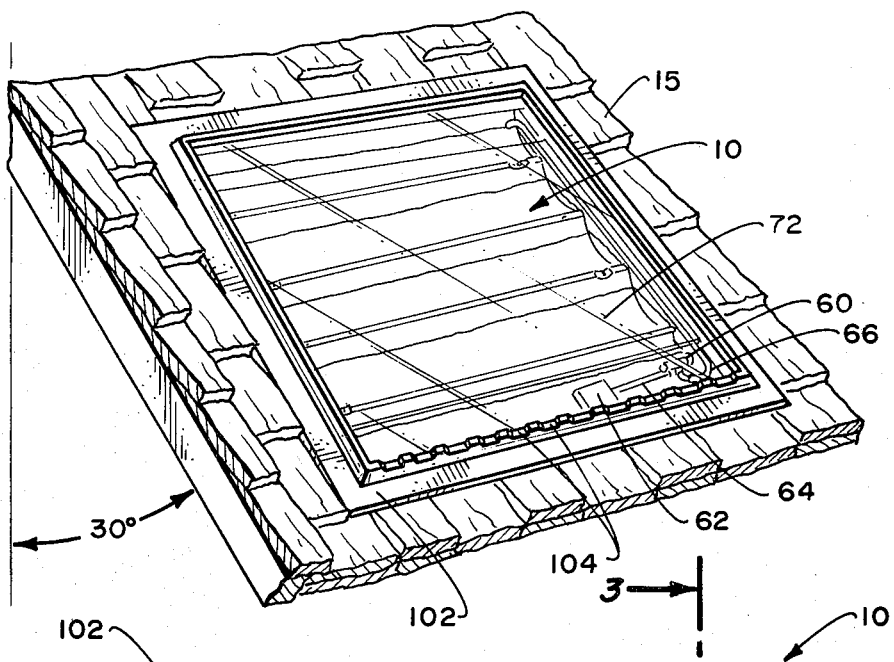
FIG. 1 is an isometric view showing the solar water distillating apparatus of this invention demonstrating one way that it can be installed upon the roof of a house.

Referring particularly to the drawings, there is shown in FIG. 1 the apparatus 10 of this invention which has been inset within a hole (not shown) formed within a roof 15 of a house. This type of installation is desirable but not imperative. However, it is necessary that the apparatus 10 be inclined so that the back end of the apparatus is at a higher elevation than the front end. A gabled roof provides this natural inclination.

The apparatus 10 comprises a housing 12, which is to be formed of any desirable rigid material, such as a fiberglass. The basic shape of the housing 12 is that of a container which has a bottom which is enclosed around its periphery by a side wall. The enclosed space is to be defined as an internal chamber. The housing 12 includes a plurality of troughs 14. Each trough 14 is substantially the same size. The longitudinal center axis of each trough 14 is located substantially horizontal. It is to be noted that there are five in number of troughs 14 shown. However, this number could be increased or decreased without departing from the scope of this invention. In cross-section, each trough 14 is arcuate and is more deeply recessed in its forwardmost sectional than in its aft section. It is within this forwardmost section that the water 16 that is to be distilled is to rest. The actual shape of each trough 14 in cross-section resembles a portion of an Archimedian Spiral. For purposes of description, the trough which is to be located at the lowest elevation will be numbered 14. The trough directly adjacent the trough 14 will be numbered 14'. The next directly adjacent trough will be numbered 14". The further next succeeding trough will be numbered 14''' and the trough that is located at the highest elevation will be numbered 14''''.

Figure 2:
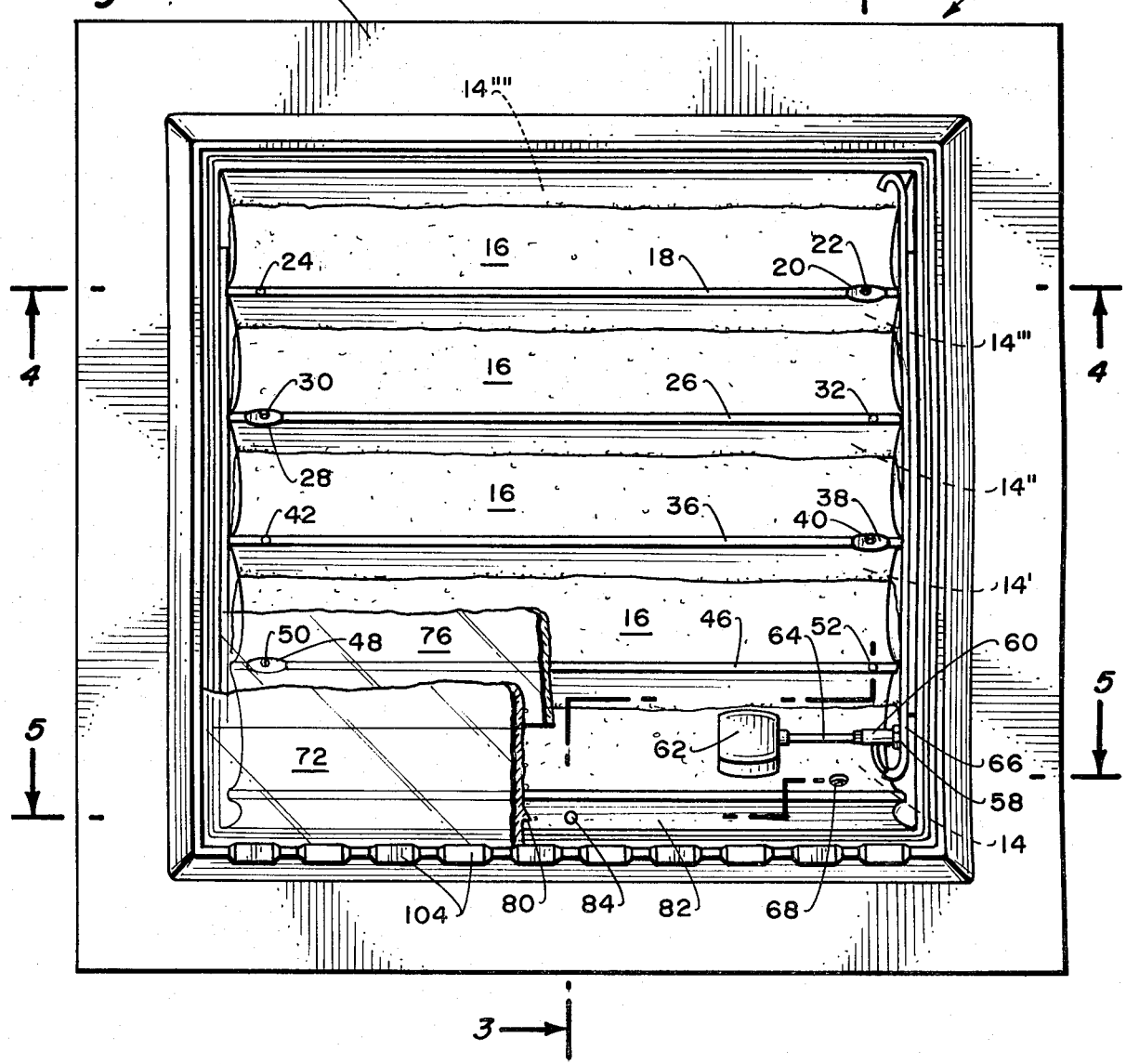
FIG. 2 is a top, plan view of the water distillation apparatus of this invention.

The ridge 18 which divides the troughs 14'''' and 14''' includes an indented area 20. Within this indented area 20 there is an opening 22. Also formed within the ridge 18 is a second opening 24. Looking particularly at FIG. 2, it can be seen that the opening 22 is positioned very near the right side of the ridge 18, with the opening 24 being located directly adjacent the left side of the ridge 18. Both openings 22 and 24 connect with connecting chamber 26. In essence, the connecting chamber 26 is located between the troughs 14'''' and 14''', exteriorly of the back surface thereof.

Similarly, there is to be a ridge 26 between the troughs 14''' and 14". Also within the ridge 26 is located an indented area 28 within which is located an opening 30. A second opening 32 is formed within the ridge 26. However, it is to be noted that the opening 32 is located adjacent the right side of the ridge 26 and the indented area 28 is located directly adjacent the left side of the ridge 26. This is the opposite of the arrangement within the ridge 18. The openings 30 and 32 are to connect with connecting chamber 34, which is located in between the troughs 14''' and 14".

In a similar manner, between the troughs 14" and 14', there is located a ridge 36. Within the ridge there is located an indented area 38, within which is located an opening 40. A second opening 42 is also formed within the ridge 36. It is to be noted that the location of the indented area 38 and the opening 42 are again reversed so that they are in the same position as they were within the ridge 18. The openings 40 and 42 connect with connecting chamber 44.

Located between the troughs 14' and 14 there is also a ridge 46. Within the ridge 46 is located an indented area 48 within which is located an opening 50. A second opening 52 is also formed within the ridge 46. The positioning of the openings 50 and 52 is essentially similar to the positioning of the openings 30 and 32. The openings 50 and 52 connect with the connecting chamber 54.

Water that is to be distilled is to be supplied under pressure from a source (not shown) through conduit 56. The conduit 56 connects through a fitting 58 to a valve assembly 60. The purpose of the fitting 58 is to establish a watertight connection with respect to the side wall of the apparatus 10 and with respect to the conduit 56. The structure of the valve 60 is such that it is capable of permitting full conducting of the water through the conduit 56 or totally prevents conducting of liquid through the conduit 56. In other words, the valve assembly 60 is what is commonly termed an on/off valve, with there being no intermediate range of flow.

The valve 60 is controlled by means of a float 62 which is connected by the rod 64 to the valve 60. The position of the flow valve 62 is controlled by the level of the water located within the trough 14. The water level within the trough 14 only needs to change a quarter to a half an inch to cause the valve 60 to move from the closed position to the open position.

With the valve 60 in the open position, water is conducted from the conduit 56 into tube 66. The tube 66 extends to within the confines of the area defined by the troughs 14''''. The water is then discharged into the trough 14''''.

When the trough 14'''' becomes completely filled, as shown in FIG. 3 of the drawings, the water 16 then flows through opening 22. The water 16 then flows into the connecting chamber 26. The purpose of the opening 24 is to provide an air relief during filling of the chamber 26.

When the chamber 26 is completely filled, the water will then begin to flow across indented area 20 to within the trough 14'''. When the trough 14''' is completely filled, water will flow through the opening 30 to within the connecting chamber 34. After filling of the connecting chamber 34, the water will then flow across the indented area 28 to within the trough 14". This procedure is repeated until each of the troughs are filled and each of the connecting chambers are filled.

It is intended that during the filling operation there will be an overfilling. There will be a time lag in the excess of water to flow from trough 14'''' to trough 14. When the trough 14 is filled, the float valve 62 will be moved to the position closing the valve 60 not permitting the entry of any additional water through the tube 66. The excess water will continue to flow for a short period of time being discharged through discharge opening 68 which is formed within the housing 12 in the area of the trough 14. The position of the discharge opening 68 is to determine the upper level of the liquid within the trough 14. The excess water is then to be conducted into conduit 70. The excess water 16 is then discarded at an appropriate location from the conduit 70 exteriorly of the apparatus 10.

Thus, it is to be seen that each time water 16 is supplied into the trough, that there will be this overfilling. This overfilling will tend to purge the high concentration of dissolved solids from one trough to another to eventually discharge such through the discharge conduit 70. This is a self-cleaning operation which occurs each time the apparatus is filled.

The purpose of the connecting chambers 26, 34 44 and 54 is so that they will tend to absorb and retain heat. This absorbing and retaining of heat assists in heating of the water 16 within each of the troughs making the apparatus 10 more efficient. Also, these connecting chambers continue to operate after the sun has set and the ambient air has cooled, thereby cooling covering lid further increasing efficiency.

A lid 72 covers the troughs, closing the internal chamber to the ambient. The lid 72 will normally be of a transparent material, such as glass. However, plastic may be employed if desired. The peripheral edges of the lid 72 are tightly enclosed with the housing 12 by means of gasket 74.

A separate transparent plate 76 may be optionally located within the internal chamber between the troughs and the lid 72. The plate 76 is attached at its side to the housing 12. The surface of the plate 76 is spaced from the interior surface of the lid 72. This spacing varies slightly from approximately one half an inch at the upper end (within trough 14'''') to three eights of an inch at the lower end (within the trough 14). The reason for this is that the humidified air within the chamber located above the trough will tend to flow automatically into this space 78 at the upper end of the plate 76. This humidified air will then have a tendency to be cooled by the surface of the lid 72 forming droplets on the interior surface thereof. This slight variation in spacing at this humidified air moves through the space 78 toward the lower end is in essence a chimney effect. This chimney effect facilitates the condensation of the liquid droplets on the interior surface of the lid 72.

The condensed liquid droplets on the lid 72 will have a natural tendency to move by gravity due to the inclined position of the housing 12 to move toward drip bar 80. As the liquid droplets move down the drip bar 80, they will merely fall free to within collecting trough 82. Collecting trough 82 is tapered so as to be deepest at its longitudinal center point. Within the longidudinal center point there is a hole 84. This hole 84 is connected into conduit 86. The conduit 86 is then, in turn, to be located within a collecting container (not shown) which it to collect the distilled water.

Referring particularly to FIG. 6, there is shown a desirable construction for the fitting that is to be located within the discharge opening 68. The fitting comprises a threaded fastener 88 within which is to be located a hole 90. The threaded fastener 88 includes an enlarged head 92. Located about the head 92 is an O-ring seal 94. The threaded fastener is threaded into the housing 12 that surrounds the hole 68. The fastener 88 is tightly held in place by means of a nut 96 which is secured to the free end of the fastener 88. The hole 90 connects with fitting conduit 98. The fitting conduit 98 includes a plurality of barbs 100 located at the free end of the conduit 98. The barbs 100 are to facilitate a secure connection with the conduit 70.

It is to be understood that the fitting shown is an elbow due to the right angled configuration formed within the conduit 98. The reason for this is that an elbow type fitting is necessary for the discharge opening 68. With respect to the opening 84 and the fitting 58, this fitting 58 does not require the use of an elbow, but must be straight. This straight fitting will be essentially similar in construction to the fitting shown in FIG. 6.

Integrally attached to the peripheral edge of the housing adjacent the periphery of the lid 72 is a flange 102. The flange 102 will be for the purpose of resting against the roof 15. It is to be understood that there will be an appropriate sealing assembly located between the flange 102 and the roof 15 to prevent entry of rain water interioraly of the roof 15 if the housing 12 is installed within the roof.

It is undesirable to have rain water contaminate the distilled water which is deposited within the trough 82. In order to prevent this from happening, the front side of the housing 12 includes a series of notches 104. These notches 104 are to provide an escape for any rain water which falls on the exterior surface of the lid 72. The notches 104 are formed within the front side of the housing 12 directly adjacent the side of the lid 72, which is at the lowest elevation.

It has been found that the apparatus of this invention will work satisfactory at any inclined angle between ten and sixty degrees. It has been further found that, depending upon the particular installation, between five and fifteen gallons per week of distilled water can be produced with the apparatus of this invention.

What is claimed is:

1. A solar water distillation apparatus comprising:

first means for providing energy to said apparatus solely from the sun;

second means for operating and for maintaining operation of said apparatus during periods of reduced solar emission, said second means comprises:

a housing having a bottom wall, said bottom wall having a peripheral edge, an enclosing side wall assembly attached to said bottom wall at said peripheral edge, said side wall assembly extending a predetermined distance from said bottom wall, said bottom wall being formed into a plurality of troughs located in a side-by-side relationship, conduit means connecting said troughs, said conduit means being formed within said bottom wall, said side wall assembly and said bottom wall defining an internal chamber, said side wall assembly having a pair of opposite walls known as a front wall and a back wall, said internal chamber being adapted to contain a quantity of water;

an inlet assembly connected to said housing, said inlet assembly for supplying water into said internal chamber, said water to substantially fill each said trough and flow from one said trough to another said trough through said conduit means;

a lid mounted on said housing closing to the ambient said internal chamber, said lid being transparent;

a distilled water outlet assembly attached to said housing, solar heat energy within said internal chamber causes distilling of the water contained therein which condenses into droplets on said lid which then moves along the surface of said lid to be deposited at said distilled water outlet assembly to then be discharged to a collecting container located exteriorly of said housing; and heat accumulating chambers mounted within said housing located exteriorly of said troughs and being closed by wall structure therebetween, there being a single heat absorbing chamber located between each directly adjacent pair of troughs, whereby said heat absorbing chambers are to function as heat capacitance means to retain heat energy within said internal chamber.

2. The solar water distillation apparatus as defined in claim 1 wherin:

each said trough having an arcuate shape in cross-section, said arcuate shape comprising a portion of an Archimedean Spiral.

3. The solar water distillation apparatus as defined in claim 1 including:

a drain outlet mounted within said housing, said drain outlet for permitting discharge of water from within said internal chamber during cleaning.

4. The solar water distillation apparatus as defined in claim 1 including:

a drip bar attached to said lid, said drip bar being located directly adjacent said distilled water outlet assembly, whereby the droplets of water collected on said lid are caused to move along said drip bar to be then disposited within said distilled water outlet assembly.

5. The solar water distillation apparatus as defined in claim 1 wherein:
said distilled water outlet assembly includes a collecting trough, a connecting conduit connected to said collecting trough, said connecting conduit being adapted to be connected to the collecting container.

6. The solar water distillation apparatus as defined in claim 1 wherein:
said housing being elevated to an inclined position resulting in said back wall being located at a higher vertical elevation than said front wall.

7. The solar water distillation apparatus as defined in claim 6 including:
said front wall includes a plurality of notches, said notches connecting directly with said lid, whereby rain water which comes into contact with the exterior surface said lid is caused to flow along said lid and be discharged through said notches.

8. The solar water distillation apparatus as defined in claim 1 including:
a chimney effect plate mounted within said internal chamber, said chimney effect plate being located directly adjacent said lid but spaced therefrom, said chimney effect plate being attached to said housing, said chimney effect plate having a back edge and a front edge, said back edge of said chimney effect plate being spaced from said back wall, said front edge of said chimney effect plate being spaced from said front wall, whereby the heated moisture laden air within said internal chamber is caused to be moved toward said back wall into contact with said lid and towards said front wall in the space between said lid and said chimney effect plate.

* * * * *